No. 609,212. Patented Aug. 16, 1898.
G. W. RICHARDSON.
GRAIN SEPARATOR.
(Application filed Nov. 11, 1897.)
(No Model.) 5 Sheets—Sheet 1.
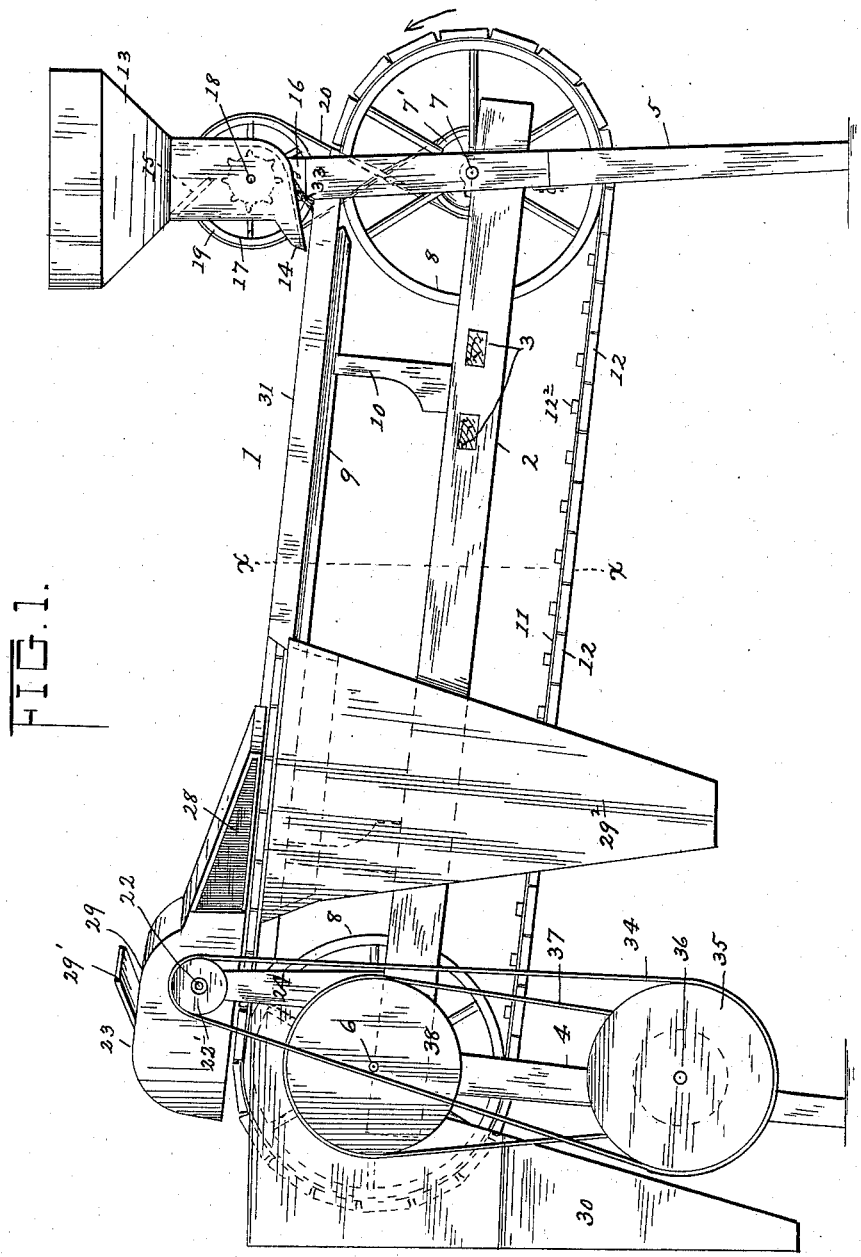
Witnesses
Saml R Turner
C. C. Hines.
Inventor:
George W. Richardson,
By R.A.D. Lacey
his Attorneys.

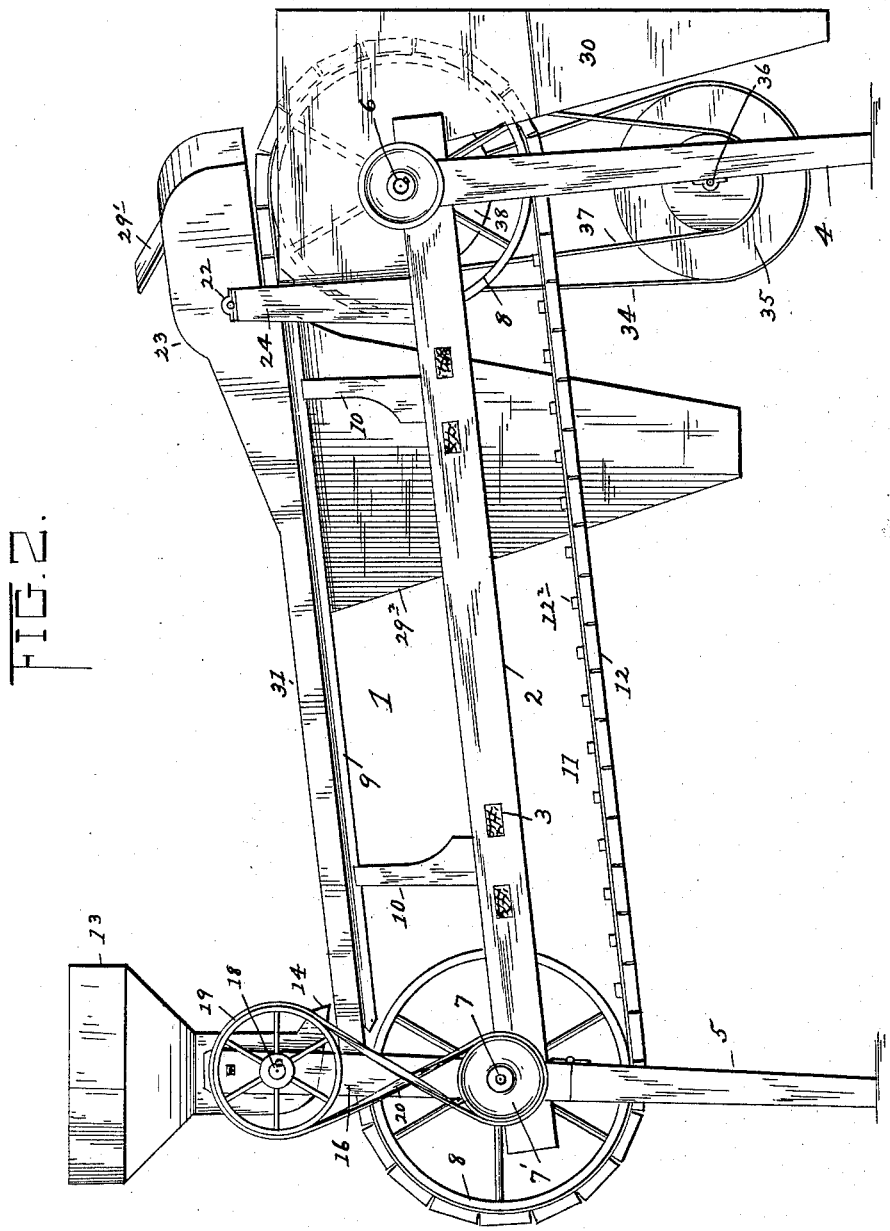

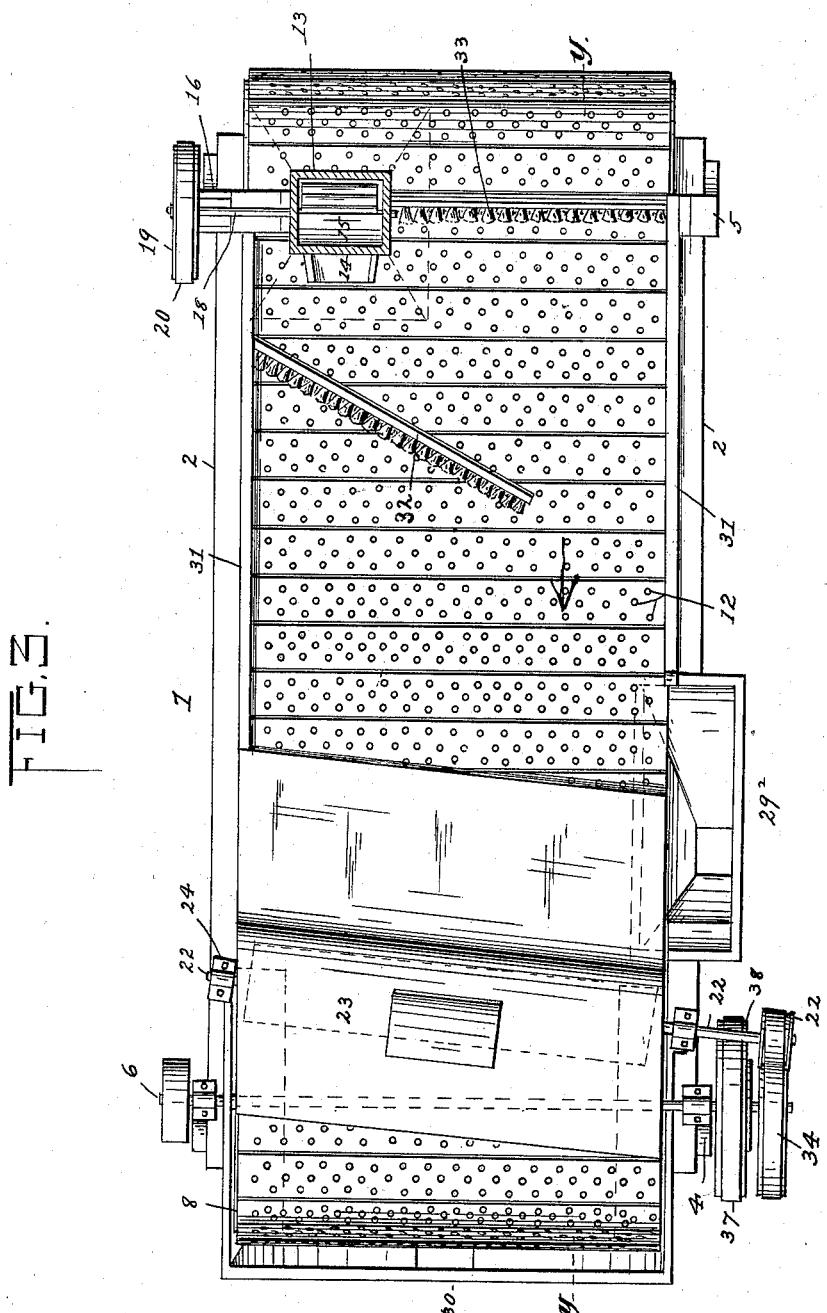

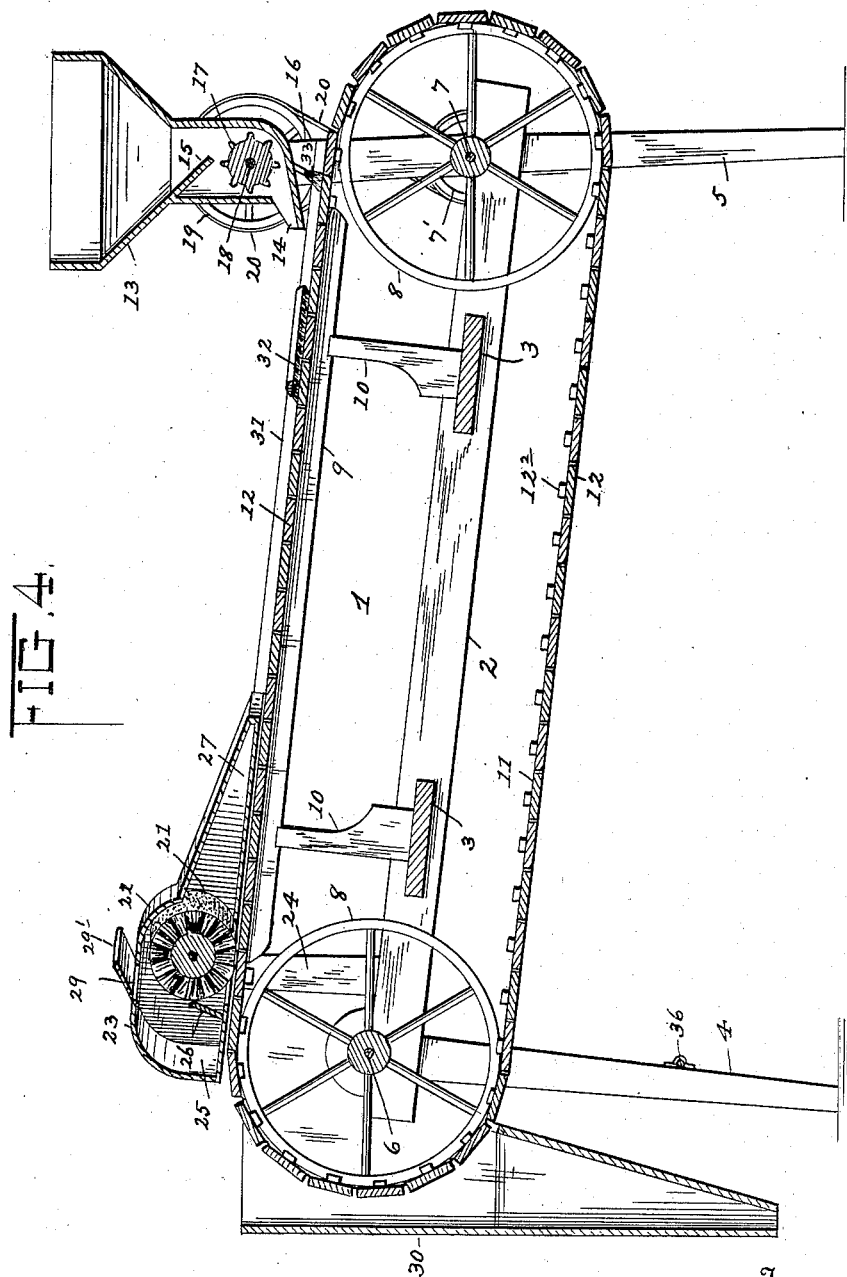

No. 609,212. Patented Aug. 16, 1898.
G. W. RICHARDSON.
GRAIN SEPARATOR.
(Application filed Nov. 11, 1897.)
(No Model.) 5 Sheets—Sheet 5.
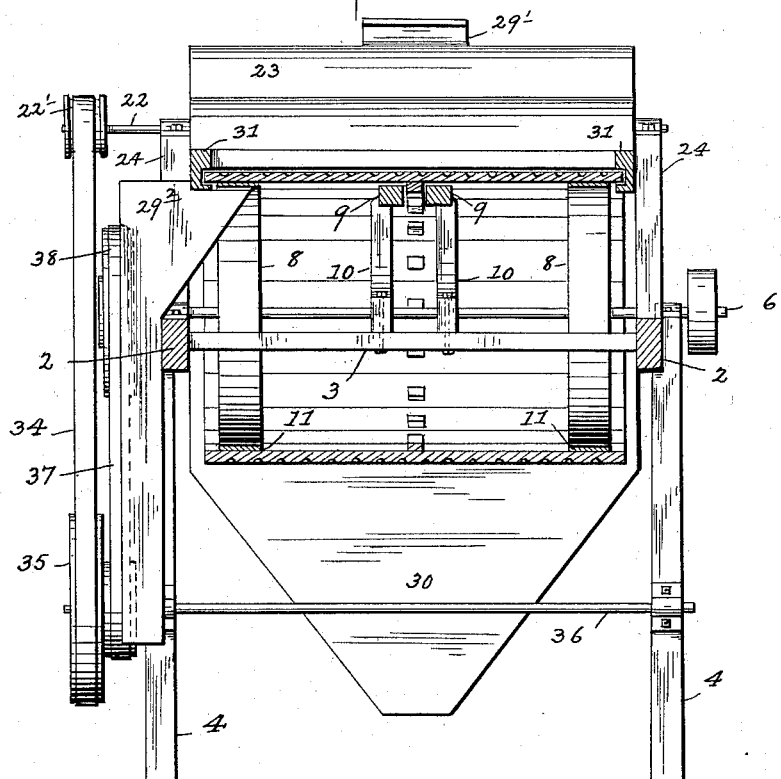
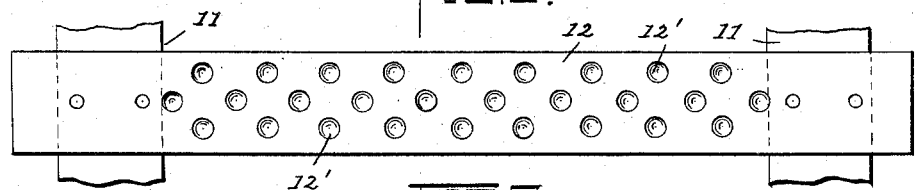
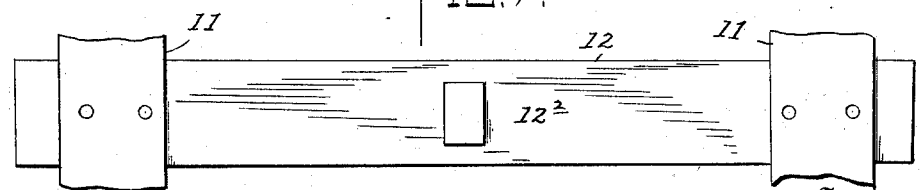
Witnesses
Sam'l R. Turner
C. C. Hines
Inventor:
George W. Richardson,
By R. H. A. W. Lacy,
his Attorneys.

UNITED STATES PATENT OFFICE.

GEORGE W. RICHARDSON, OF SPARTA, WISCONSIN.

GRAIN-SEPARATOR.

SPECIFICATION forming part of Letters Patent No. 609,212, dated August 16, 1898.

Application filed November 11, 1897. Serial No. 658,160. (No model.)

*To all whom it may concern:*

Be it known that I, GEORGE W. RICHARDSON, a citizen of the United States, residing at Sparta, in the county of Monroe and State of Wisconsin, have invented certain new and useful Improvements in Grain-Separators; and I do hereby declare the following to be a full, clear, and exact description of the invention, such as will enable others skilled in the art to which it appertains to make and use the same.

My invention relates to improvements in grain-separators, and has for its primary object to provide a grain-separating apparatus of novel and improved construction designed to increase the efficiency of the separating action.

With this and other objects in view the invention consists in certain novel features of construction and combination of parts, as will be hereinafter more fully described, and specifically set forth in the appended claims.

In the accompanying drawings, illustrating the invention, Figure 1 is an elevational view of my improved grain-separator looking toward one side thereof. Fig. 2 is an elevational view looking toward the opposite side; Fig. 3, a top plan view; Fig. 4, a longitudinal section taken on the line $y\ y$ of Fig. 1; Fig. 5, a vertical transverse section taken on the line $x\ x$ of Fig. 1, and Figs. 6 and 7 are respectively a top plan view and a bottom plan view of one of the belt-lags.

Referring now more particularly to the said drawings, 1 represents the frame of the separator, which comprises in its construction two longitudinal side bars 2, connected by transverse bars 3. This frame is mounted at the feeding-in end upon legs 4 and at the delivery end upon legs 5, said legs 4 being preferably made longer than the legs 5 to cause the frame to incline upward gradually from its feeding-in end to its delivery end, as shown. The legs 4 may be made detachable and foldable, if desired, for a purpose presently described.

6 represents a transverse drive-shaft mounted in bearings on the legs 4, and 7 a similar shaft mounted in bearings on the legs 5, and these shafts each carry a belt-pulley 8 for driving it by power, although it may be provided in lieu thereof with a crank-handle for driving it by hand. At the center of the frame are two spaced parallel longitudinally-extending guide bars or strips 9, carried by uprights 10, mounted upon the transverse bars 3.

Passing around the wheels 8 is an endless carrier which conveys the grain from a hopper at the lower end of the frame to the separating mechanism and delivery-spout at the upper end of the frame. This carrier consists of two endless bands or belts 11, which respectively pass around the two wheels 8 on the shafts 6 7 at opposite sides of the frame, and a continuous series of transverse lags or slats 12, connecting between and secured at their ends to said belts. Each of these lags is provided in its outer side or face with a series of pits or pockets 12' and on its inner side or face with a guide block or lug $12^2$, which is adapted to run between the guide 9 and prevent the upper stretch of the carrier which carries the grain from moving laterally or sidewise and running off the belt-wheels. The pits or pockets 12' are made just large or deep enough to contain wheat or rye grains, but are too small to receive oats.

Located at the lower or feeding-in end of the frame, above the upper stretch of the carrier, is a hopper 13, provided with a spout 14 and a deflector 15 forming a contracted throat which controls the feed of the grain from the hopper to said spout. This hopper is arranged at one side of the frame, which for convenience of illustration I will call the "right-hand" side, and is carried by a post 16, rising from one of the legs 5. The grain as it falls from the hopper is fed through the spout onto the carrier by a feed-wheel or beater 17, located in said spout and mounted upon a shaft 18, carrying a pulley 19. A belt 20 connects this pulley with a pulley 7' on the shaft 7.

21 represents a rotary brush extending diagonally of the frame, adjacent to its delivery end, and mounted upon a shaft 22, carrying at one end a pulley 22'. This brush is inclosed within a dome-shaped case or housing 23, having position just above the carrier and mounted upon uprights 24, rising from the side bars 2. This housing is provided at its rear end with a chamber or pocket 25, formed by a division-wall 26, and at its front end with a contracted chamber 27, having a side outlet 28, which faces toward the left-hand side of the frame. The housing is also provided in its bottom with a slot through which the brush projects and in its top with an inlet 29 and deflector 29'.

At the left-hand side of the frame, immediately in line with the side outlet 28, is a spout 29, which receives tailings, and at the upper end of the frame is a delivery-spout 30, which receives the winnowed grain. At each side of the frame there is also a rail or fender-strip 31, which serves to prevent the grain from dropping off the carrier. These fender-strips may be grooved to receive the ends of the lags, as shown in Fig. 5.

The operation of the parts thus far described is as follows: The grain is fed from the hopper onto the moving upper stretch of the carrier and is thence carried beneath the housing 23 to the brush. The wheat and rye fall into the pits or pockets 12' of the lags 12 and pass beneath the brush and are delivered into the spout 30, while the oats, which are too large to occupy the pockets, are swept into the contracted chamber 27 and thence across to the left-hand side of the machine and discharged through the outlets 28 into the spout 29. The chaff and other lighter particles are carried around by the brush and deposited into the chamber or pocket 25. The function of the inlet 28 is to admit air into the casing, and thereby prevent the grain from being sucked around into the said chamber 25 with the chaff, and that of the deflector 28' to prevent the chaff from being blown out. The grain as it is fed from the hopper at the right-hand side is spread evenly over the face of the lags by a brush 32, extending diagonally from the right-hand side, as shown, and a transverse brush 33 is provided to prevent the grain from falling backward past the hopper.

Power is transmitted to the brush-shaft through the medium of a belt 34, passing over the pulley 22' on said shaft and the larger face of a stepped pulley 35, carried by a shaft 36, mounted in bearings on the legs 4. This shaft is driven by a belt 37, passing over the smaller face of the pulley 35, and a pulley 38, mounted upon one end of the shaft 7. The opposite end of this shaft 8, as before stated, may be provided with the belt-pulley 9 or a crank-handle for driving it by power or manually, as desired.

Having thus fully described my invention, what I claim as new and useful, and desire to secure by Letters Patent, is—

1. In a grain-separator, the combination, with a frame, of an inclined grain-carrier, a hopper arranged at one end and side of the frame and adapted to discharge the grain onto said carrier, a tailings-spout at the side of the frame diagonally opposite the hopper, a delivery-spout at the end of the frame opposite the hopper, a diagonally-arranged rotary brush adjacent to said delivery-spout and adapted to sweep the tailings to one side of the frame and into said tailings-spout, and mechanism for operating the carrier and brush, substantially as described.

2. In a grain-separator, the combination, with a frame, of a carrier provided with pits or pockets of size to receive one character of grain but too small relatively to receive another character of grain, a hopper adapted to discharge the grain upon one side of the carrier, a tailings-spout diagonally opposite the hopper, a delivery-spout at the end of the frame diametrically opposite said hopper, and a diagonally-arranged brush adapted to allow the grain occupying the pits or pockets to pass to the delivery-spout and to sweep the grain not occupying said pits or pockets across the carrier into said tailings-spout, substantially as described.

3. In a grain-separator, the combination of a frame carrying belt-wheels, an endless carrier consisting of a pair of belts running over said wheels and a continuous series of transverse slats or lags connecting between said belts, said lags being provided in their outer faces with pits or pockets, a hopper adapted to discharge the grain upon one side of the carrier, a delivery-spout at the end of the frame diametrically opposite said hopper, a tailings-spout diagonally opposite the hopper, and a diagonally-arranged brush adapted to allow the grain occupying the pits or pockets to pass to the delivery-spout and to sweep the grain not occupying said pits or pockets across the carrier into said tailings-spout, substantially as described.

4. In a grain-separator, the combination of a frame carrying belt-wheels, and two parallel longitudinal guide-bars, an endless carrier consisting of a pair of belts running over said wheels and a continuous series of transverse slats or lags connecting between said belts, said lags being provided in their outer faces with pits or pockets and in their inner faces with guide blocks or lugs adapted to run between said guide-bars, a hopper adapted to discharge the grain upon one side of the carrier, a tailings-spout diagonally opposite the hopper, a delivery-spout at the end of the frame diametrically opposite said hopper, and a diagonally-arranged brush adapted to allow the grain occupying the pits or pockets to pass to the delivery-spout and to sweep the grain not occupying said pits or pockets across the carrier into said tailings-spout, substantially as described.

5. In a grain-separator, the combination, with a frame, of a carrier provided with pits or pockets of size to receive one character of grain but too small relatively to receive another character of grain, a hopper adapted to discharge the grain upon one side of the carrier, a diagonal brush to spread the grain evenly over the carrier, a transverse brush alongside the hopper to prevent the grain from passing back of said hopper, a tailings-spout diagonally opposite the hopper, a delivery-spout at the end of the frame diametrically opposite said hopper, and a diagonally-arranged brush adapted to allow the grain occupying the pits or pockets to pass to the delivery-spout and to sweep the grain not occupying said pits or pockets across the carrier into said tailings-spout, substantially as described.

6. In a grain-separator, the combination of a frame, an endless carrier having pits or pockets to receive the grain, a hopper at the front end of the frame adapted to discharge the grain upon one side of the carrier, a tailings-spout diagonally opposite said hopper, a delivery-spout at the rear end of the frame, a casing or housing adjacent to said delivery-spout provided in its bottom with a slot and at its front end with a contracted chamber having a side outlet facing said tailings-spout, and a diagonal rotary brush inclosed in said housing and projecting through said slot and adapted to sweep the tailings into the contracted chamber of the casing and through the side outlet thereof into the tailings-spout, substantially as described.

7. In a grain-separator, the combination of a frame, an endless carrier having pits or pockets to receive the grain, a hopper at the front end of the frame adapted to discharge the grain upon one side of the carrier, a tailings-spout diagonally opposite said hopper, a delivery-spout at the rear end of the frame, a casing or housing adjacent to said delivery-spout provided with a bottom slot, a top air-inlet, a chaff pocket or chamber at its rear end and a contracted chamber at its front end having a side outlet facing said tailings-spout, and a diagonal rotary brush inclosed in said housing and projecting through said slot and adapted to sweep the tailings into the contracted chamber of the casing and through the side outlet thereof into the tailings-spout, substantially as described.

In testimony whereof I affix my signature in presence of two witnesses.

GEORGE W. RICHARDSON.

Witnesses:
ALICE L. SHOLTS,
BLANCHE E. SHOLTS.